(12) United States Patent
Fletcher et al.

(10) Patent No.: US 7,221,275 B2
(45) Date of Patent: May 22, 2007

(54) TUNEABLE WIRELESS TAGS USING SPATIALLY INHOMOGENEOUS STRUCTURES

(75) Inventors: Richard Fletcher, Cambridge, MA (US); Neil Gershenfeld, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 51 days.

(21) Appl. No.: 10/654,870

(22) Filed: Sep. 3, 2003

(65) Prior Publication Data

US 2004/0134991 A1  Jul. 15, 2004

Related U.S. Application Data

(60) Provisional application No. 60/408,141, filed on Sep. 3, 2002.

(51) Int. Cl.
*G08B 13/14* (2006.01)

(52) U.S. Cl. .................. 340/572.1; 340/572.7

(58) Field of Classification Search ............... 340/235, 340/705, 572, 572.7, 572.5, 572.3; 235/491; 343/748
See application file for complete search history.

(56) References Cited

U.S. PATENT DOCUMENTS

| | | | | |
|---|---|---|---|---|
| 3,967,161 A | | 6/1976 | Lichtblau ............ 317/101 |
| 4,021,705 A | * | 5/1977 | Lichtblau ............ 361/765 |
| 4,074,249 A | | 2/1978 | Minasy ............... 340/280 |
| 4,075,618 A | | 2/1978 | Montean .............. 340/280 |
| 4,484,184 A | | 11/1984 | Gregor et al. ........ 340/572 |
| 4,510,489 A | | 4/1985 | Anderson, III et al. ... 340/572 |
| 4,578,654 A | | 3/1986 | Tait .................. 333/175 |
| 4,598,276 A | | 7/1986 | Tait .................. 340/572 |
| 4,658,264 A | | 4/1987 | Baker ................. 343/895 |
| 4,818,312 A | | 4/1989 | Benge ................. 156/52 |
| 4,945,399 A | * | 7/1990 | Brown et al. .......... 257/698 |
| 5,119,070 A | * | 6/1992 | Matsumoto et al. ..... 340/572.5 |
| 5,381,137 A | | 1/1995 | Ghaem et al. ......... 340/572 |
| 5,446,447 A | * | 8/1995 | Carney et al. ......... 340/572.4 |
| 5,565,849 A | | 10/1996 | Ho et al. ............. 340/572 |
| 5,604,485 A | | 2/1997 | Lauro et al. .......... 340/572 |
| 5,608,417 A | | 3/1997 | de Vall ............... 343/895 |
| 5,650,236 A | | 7/1997 | Hirano et al. ......... 428/611 |
| 5,729,201 A | | 3/1998 | Jahnes et al. ......... 340/572 |
| 5,821,859 A | | 10/1998 | Schrott et al. ........ 340/572 |
| 5,831,532 A | * | 11/1998 | Gambino et al. ....... 340/572.1 |
| 5,902,437 A | | 5/1999 | McDonough et al. ..... 156/234 |
| 6,025,725 A | | 2/2000 | Gershenfeld et al. ... 324/652 |
| 6,031,458 A | | 2/2000 | Jacobsen et al. ...... 340/572.5 |
| 6,067,002 A | | 5/2000 | Fujino et al. ......... 336/200 |
| 6,087,940 A | | 7/2000 | Caperna et al. ....... 340/572.5 |
| 6,104,311 A | * | 8/2000 | Lastinger ............ 340/10.51 |
| 6,262,663 B1 | * | 7/2001 | Altwasser et al. ..... 340/572.5 |

* cited by examiner

*Primary Examiner*—Daniel Wu
*Assistant Examiner*—Travis R. Hunnings
(74) *Attorney, Agent, or Firm*—Norma E. Henderson

(57) ABSTRACT

Wireless tags with a plurality of non-equivalent current pathways altered to collectively represent encoded information, each of which responds differently to an interrogation signal. The element is subjected to a signal stimulating the current pathways, each of which contributes to an overall element response. The information may be recovered from the salient features of this overall response. These salient features include resonant frequency, amplitude, relative peak position, relative peak amplitude, damping, and Q factor.

36 Claims, 10 Drawing Sheets

TUNEABLE WIRELESS TAGS USING SPATIALLY INHOMOGENEOUS STRUCTURES

CROSS-REFERENCE TO RELATED APPLICATIONS

This application claims the benefits of U.S. Provisional Patent Application No. 60/408,141, filed on Sep. 3, 2002 now abandoned.

FIELD OF THE INVENTION

The present invention relates to remote sensing, tracking, and identification (ID), and in particular to the production and use of inexpensive ID tags.

BACKGROUND OF THE INVENTION

Various monitoring technologies are known and used to monitor the location of an article or to provide identification in a wide range of contexts. One such technology, known as "tagging," is commonly employed, for example, in shoplifting security systems, security-badge access systems and automatic sorting of clothes by commercial laundry services. These conventional tagging systems may use some form of radio-frequency identification (RF-ID). In such systems, RF-ID tags and a tag reader (or base station) are separated by a small distance to facilitate near-field electromagnetic coupling therebetween. Far-field radio tag devices (far-field meaning that the sensing distance is long compared to the wavelength and size of the antenna involved) are also known and used for tagging objects at larger distances.

The near-field coupling between the RF-ID tag and the tag reader may be used to supply power to the RF-ID tag (so that the RF-ID tag does not require a local power source) and to communicate information to the tag reader via changes in the value of the tag's impedance. In particular, the RF-ID tag incorporates an active switch, packaged as a small electronic chip, for encoding the information in the RF-ID tag and communicating this information via an impedance switching pattern. The impedance directly determines the reflected power signal received by the reader, and as a result, the RF-ID tag is not necessarily required to generate any transmitted signal.

It is desirable in commercial applications or technology to reduce the cost of RF-ID tags. Though simple in principle, RF-ID tags may require sophisticated manufacturing techniques to produce. A more economical alternative involves marker elements adapted to affect an interrogation signal in a measurable, characteristic way. Many such systems utilize magnetic or magnetomechanical tags. For example, a magnetic wire or strip exhibiting harmonic behavior may be stimulated within an interrogation zone by transmitter antenna coils. The coils generate an alternating magnetic interrogation field, which drives the marker into and out of saturation, thereby disturbing the interrogation field and producing alternating magnetic fields at frequencies that represent harmonics of the interrogation frequency. The harmonics are detected by receiver antenna coils, which may be housed in the same structure as the transmitter coils. Accordingly, the appearance of a tagged article within the zone—which may be defined, for example, near the doors of a retail store or library—is readily detected.

Inexpensive, magnetic antitheft systems tend to encode very little, if any, information. Essentially, the tag merely makes its presence known. Although some efforts toward enhancing the information-bearing capacity of magnetic tags have been made—see, e.g., U.S. Pat. Nos. 5,821,859; 4,484,184; and 5,729,201, which disclose tags capable of encoding multiple bits of data—the tags themselves tend to be complex and therefore expensive to produce, and may require special detection arrangements that limit the interrogation range (the '859 patent, for example, requires scanning a pickup over the tag) or involve specialized equipment.

SUMMARY OF THE INVENTION

In one aspect, the invention relates to a device that has a plurality of non-equivalent interacting current pathways that together represent multi-bit information. The device is responsive to a wireless electromagnetic interrogation signal, whereby each of the pathways responds differently to the signal and contributes to the provision of the multi-bit information. Furthermore, some of the non-equivalent current pathways have been altered to encode the represented multi-bit information.

In one embodiment, each of the pathways exhibits a different electromagnetic response having at least one electromagnetic resonance, the responses differing from each other in at least one of resonant frequency, amplitude, quality ("Q") factor, or damping. In various embodiments, each resonance corresponds to a respective different capacitance parameter of the device, a respective different inductance parameter of the device, or both, and the values of the capacitance and inductance are adjustable.

In various embodiments the pathways are altered by severing at least one pathway from the other pathways, shorting at least one pathway to a pathway on an opposing face of the device, changing the length of at least one pathway, changing the overlap between at least one pathway and its corresponding pathway on the opposing face of the device, changing the position of at least one pathway relative to the other pathways, changing the spacing between at least one pathway and its corresponding pathway on the opposing face of the device, and changing the capacitance of at least one pathway by placing a metal element between the at least one pathway and its corresponding pathway on the opposing face of the device.

In another aspect, the invention relates to an electromagnetically-responsive structure for encoding multi-bit information, whereby the encoded information is wirelessly readable in the frequency domain. The structure includes first and second current pathways having different electromagnetic responses, whereby at least one of the pathways is altered to encode the represented multi-bit information. The first and second current pathways are electromagnetically coupled to each other in such a manner that the coupling results in at least one attribute of the electromagnetic responses approximating a norm.

In one embodiment, at least a portion of the multi-bit information is readable through variations in at least one of the salient features of the electromagnetic responses, the salient features including resonant frequency, amplitude, quality ("Q") factor, and damping. At least one of the current pathways may comprise an open-loop geometry or a closed-loop geometry.

In another aspect, the invention relates to a method for encoding multi-bit information on a wireless tag, whereby the encoded information is wirelessly readable in the frequency domain. This method includes providing first and second current pathways having different electromagnetic responses, whereby at least one of the pathways is altered to encode the represented multi-bit information. Further, the first and second current pathways are electromagnetically coupled to each other, such that at least one attribute of the electromagnetic responses approximates a norm. The salient features of the combined electromagnetic responses of the first and second current pathways encode the multi-bit information.

In one embodiment, the first and second current pathways are physically adjoined. In various embodiments, the alterations include electrically shorting a pathway, or varying one or more of pathway length, pathway overlap area, or pathway relative position.

In yet another aspect, the invention relates to a method of wirelessly sensing multi-bit information comprising the steps of providing a device responsive to a wireless electromagnetic signal and having a plurality of non-equivalent current pathways, wherein at least some of the plurality of pathways have been altered to encode the multi-bit information and respond differently to the excitation signal. Subjecting the device to a wireless electromagnetic excitation signal permits the recovery of the multi-bit information based on an interaction between the device and the signal. Salient features of the electromagnetic response of the device are extracted and the multi-bit information is recovered from the values of the salient features in the response.

In one embodiment, each of the salient features corresponds to a different capacitance feature of the device. In another embodiment, each of the salient features corresponds to a different inductance feature of the device. In various embodiments the pathways are altered by severing at least one pathway from the other pathways, shorting at least one pathway to a pathway on an opposing face of the device, changing the length of at least one pathway, changing the overlap between at least one pathway and its corresponding pathway on the opposing face of the device, changing the position of at least one pathway relative to the other pathways, changing the spacing between at least one pathway and its corresponding pathway on the opposing face of the device, and changing the capacitance of at least one pathway by placing a metal element between the at least one pathway and its corresponding pathway on the opposing face of the device.

In yet another aspect, the invention relates to an electromagnetically-responsive structure for encoding multi-bit information, whereby the encoded information is wirelessly readable in the frequency domain. The structure includes a first pathway having a first electromagnetic response and having a pair of opposing, electrically-conductive loops electrically connected through at least one point. The structure also includes a second electrically-conductive pathway characterized by having a second electromagnetic response and being electromagnetically coupled to the first loop. The second pathway also has a pair of opposing, electrically-conductive loops electrically connected through at least one point. The electromagnetic coupling results in at least one attribute of the first and second electromagnetic responses approximating a norm.

BRIEF DESCRIPTION OF THE DRAWINGS

The invention is pointed out with particularity in the appended claims. The advantages of the invention may be better understood by referring to the following description taken in conjunction with the accompanying drawings in which:

DETAILED DESCRIPTION OF THE INVENTION

The invention relates to a class of devices ("tags") adapted for storing multi-bit information and conveying the stored information in response to wireless interrogation signals. In some embodiments these tags include electrical conductors configured as multiple nonequivalent current pathways, whereby each of the conductors contributes to the overall electromagnetic response of the device and at least some of the conductors have been altered to encode the multi-bit information. Generally, the current pathways are defined by electrical conductors configured as open loops, closed loops, or combinations of open and closed loops. An open loop geometry generally includes, for example, linear embodiments, curvilinear embodiments, and combinations thereof.

Figure 1:
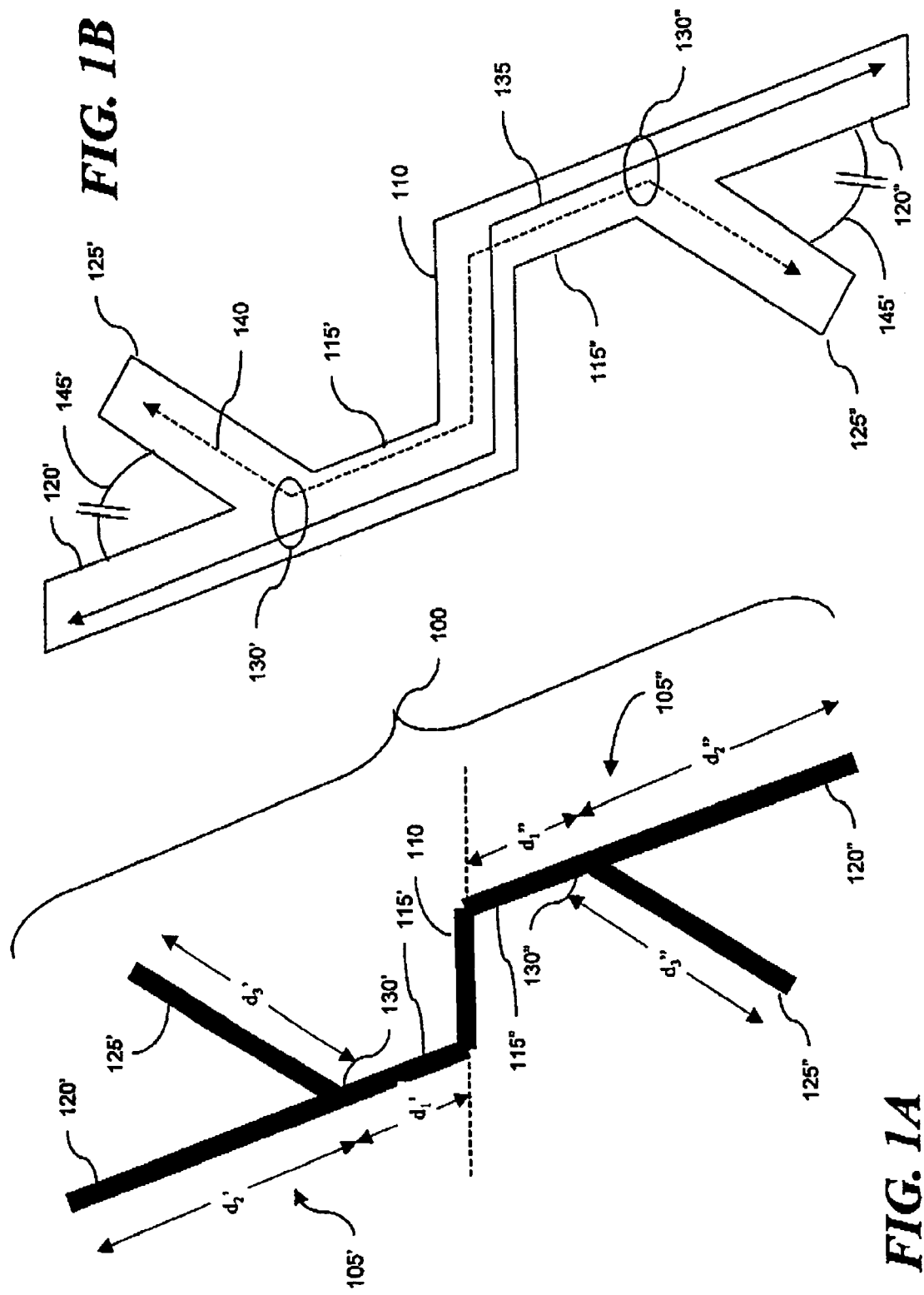
FIGS. 1A and 1B are schematic diagrams depicting the geometry and current paths of an open-loop embodiment of the invention having two branches.

With reference to FIG. 1A, a representative tag structure 100 having current pathways configured as an open-loop geometry includes a top portion, such as a top half 105', and a bottom portion, such as a bottom half 105", each portion being in electrical communication with the other through an electrical shunt 110. The top half 105' is further defined by three electrically-conducting traces: a top segment 115'; a first top branch 120'; and a second top branch 125'. The top segment 115', the first top branch 120', and the second top branch 125' are in electrical communication with each other, defining a top node 130'. The bottom half 105" is similarly defined by three electrically-conducting traces: a bottom segment 115"; a first bottom branch 120"; and a second bottom branch 125". The bottom segment 115", the first bottom branch 120", and the second bottom branch 125" are in electrical communication with each other, defining a bottom node 130".

The top segment 115' is configurable as an electrically-conducting trace having a length $d_1'$, the first top branch 120' is configurable as an electrically-conducting trace having a length $d_2'$, and the second top branch 125' is configurable as an electrically-conducting trace having a length $d_3'$. Similarly, the bottom segment 115", the first bottom branch 120", and the second bottom branch 125" are each configurable as electrically-conducting traces having respective lengths $d_1"$, $d_2"$, and $d_3"$. To enhance the resonance response of the tag 100, the top half 105', and the bottom half 105" are configured with a high degree of symmetry. For example, the lengths may be selected such that $d_1 \approx d_1"$, $d_2' \approx d_2"$, and $d_3' \approx d_3"$. In some embodiments, as shown in FIG. 1A, the top half 105' and bottom half 105" are symmetric about the shunt 110 (i.e., the coordinate origin of a Cartesian coordinate system defining a plane containing the tag 100, as indicated by the dashed line). As will be discussed in greater detail below, the top half 105' and bottom half 105" are generally folded about their respective ends of the shunt 110, such that the halves 105', 105", overlap each other, residing in parallel, but separate planes.

FIG. 1B illustrates the different current paths of the above-described tag structure 100. Interrogation by a wireless electromagnetic field induces an electrical current distribution in the tag structure 100. The current distribution depends upon factors such as the interrogating field's frequency (or wavelength), its amplitude, and the spatial orientation of its electric and/or magnetic field components. Under interrogation conditions, resonant currents flow along one or more current pathways of the tag 100. For example, a first current may be induced along the current pathway 135 formed by the first top branch 120', the top segment 115', the shunt 110, the bottom segment 115", and the first bottom branch 120". Under stimulation by an appropriate interrogating field a first structural resonance occurs in the first current pathway 135. Similarly, a second current may be induced along a second current pathway 140 formed by the second top branch 125', the top segment 115', the shunt 110, the bottom segment 115", and the second bottom branch 125". Under stimulation by another interrogating field having different properties, a second structural resonance occurs in the second current pathway 140.

Once folded, the opposing halves (sides) of the structure create a distributed capacitance along the length of the branches. This distributed capacitance allows the electric field to be distributed across the entire area of the tag. This results in more stable resonances that are less susceptible to de-tuning by external electromagnetic influences. This is a desirable property for commercial applications such as packaging labels for materials such as liquids or metal objects.

Figure 2:
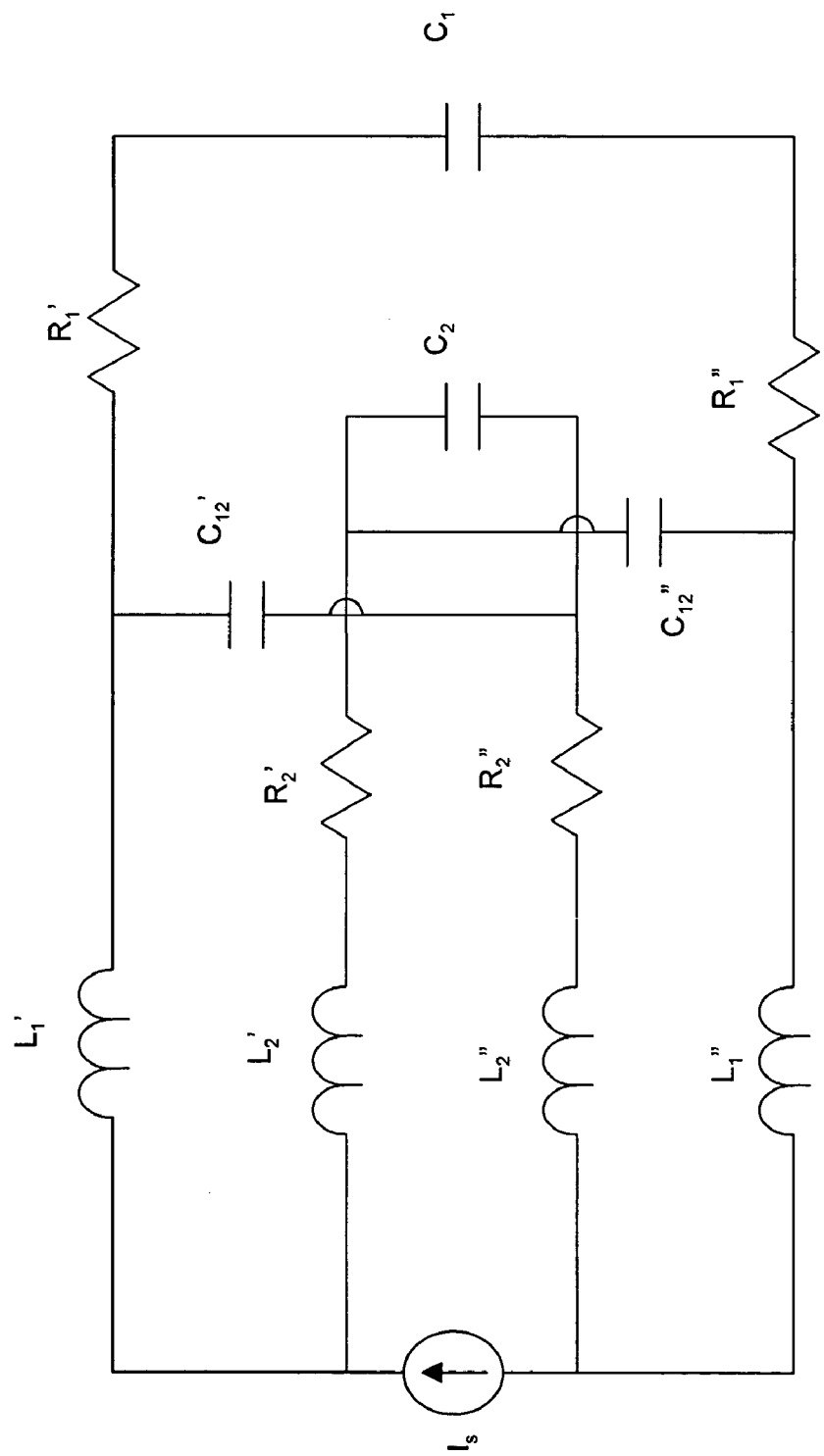
FIG. 2 is a circuit diagram depicting an equivalent circuit of the embodiment illustrated in FIGS. 1A and 1B.

FIG. 2 depicts an equivalent electrical circuit for the embodiment of FIGS. 1A and 1B. A parallel, open loop resonator is formed by the structure defining the first and second current pathways 135, 140 illustrated in FIG. 1B. Resistor $R_1'$ represents an approximation of the ohmic ("$I^2R$") loss, and the inductor $L_1'$ represents an approximation of the series inductance each associated with both the top segment 115' and the first top branch 120'. Resistor $R_1"$ represents an approximation of the ohmic loss, and the inductor $L_1"$ represents an approximation of the series inductance, each associated with both the bottom segment 115" and the first bottom branch 120". The capacitor $C_1$ represents an approximation of the capacitance between the combined top segment 115'-first top branch 120' and the combined bottom segment 115-first bottom branch 120" and is a function of the overlapping area and the dielectric constant of any intervening material.

Similarly, resistor $R_2"$ represents an approximation of the ohmic loss, and the inductor $L_2"$ represents an approximation of the series inductance each associated with both the bottom segment 115" and the second bottom branch 125". The capacitor $C_2$ represents an approximation of the capacitance between the combined top segment 115'-second top branch 125' and the combined bottom segment 115"-second bottom branch 125" and is also a function of the overlapping area and the dielectric constant of any intervening material.

Capacitor $C_{12}'$ represents an approximation of an interbranch capacitance between the first top branch 120' and the second top branch 125'. Likewise, capacitor $C_{12}"$ represents an approximation of the interbranch capacitance between the first bottom branch 120" and the second bottom branch 125". Capacitors $C_{12}'$ and $C_{12}"$ respectively correspond to the interbranch capacitors 145' and 145" illustrated in FIG. 1B. A current source $I_S$ represents approximate currents induced by an interrogating field. The resulting electrical circuit includes two different resonant, or "tank" circuits. The first tank circuit is defined by the circuit path including the elements $L_1'$, $R_1'$, $C_1$, $R_1"$, and $L_1"$. The second tank circuit is defined by the circuit path including the elements $L_2'$, $R_2'$, $C_2$, $R_2"$, and $L_2"$. Each tank circuit exhibits a resonant response relating to the values of its electrical components.

Figure 3A:
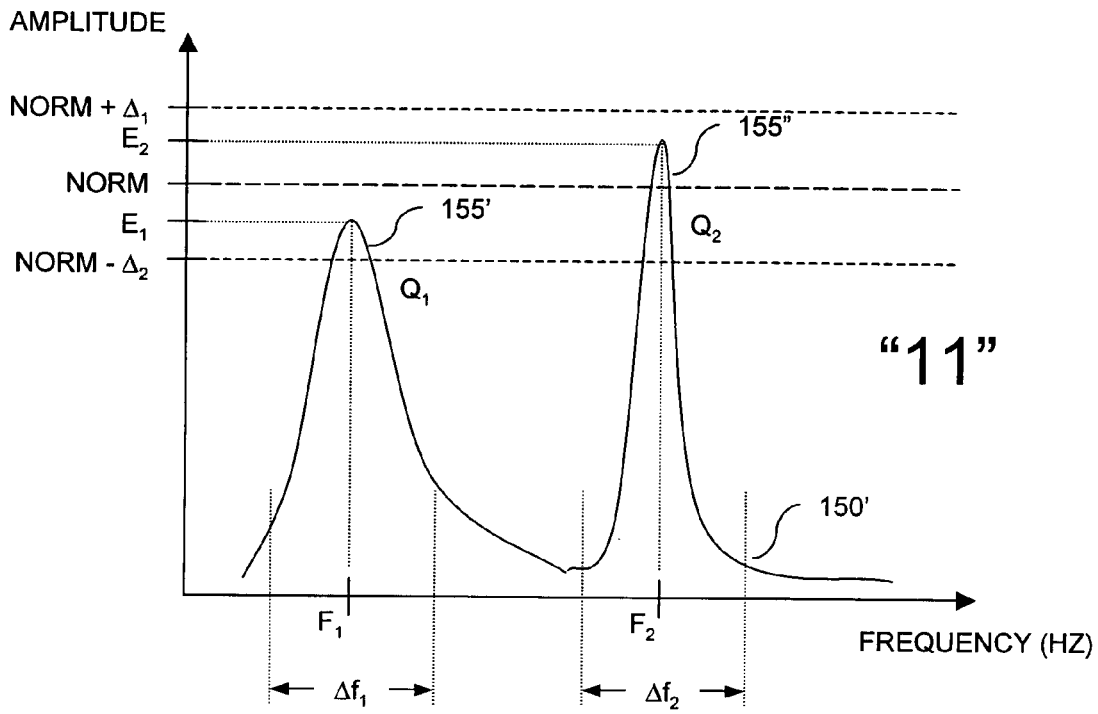
FIGS. 3A and 3B are plots of the electromagnetic response of the embodiment illustrated in FIGS. 1A, 1B, and 2.
Figure 3B:
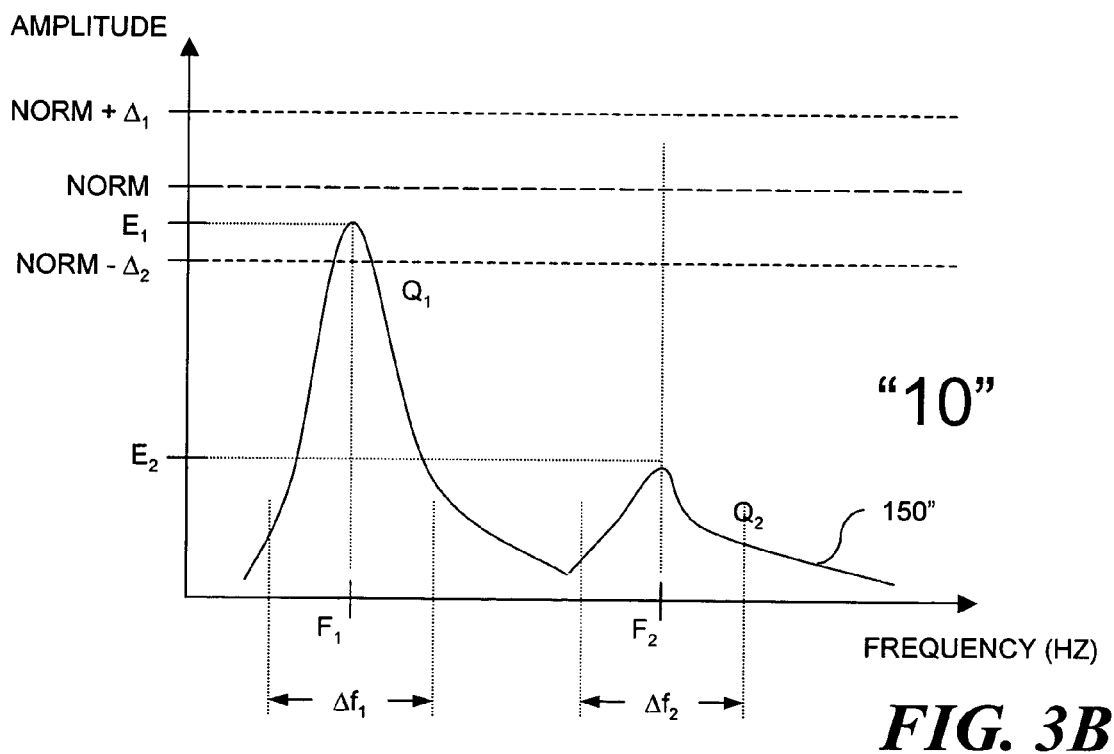

A representative electrical response of a tag, such as the tag structure 100 of FIGS. 1A, 1B, and 2, is illustrated in FIGS. 3A and 3B. A first electrical response curve 150' depicts the value of an electrical response parameter versus frequency. As illustrated, the vertical coordinate axis represents a range of amplitude for the electrical response parameter. The horizontal axis represents a range of frequencies over which the electrical response parameter is observed. The first electrical response curve 150' shows an electrical response of the tag structure 100 resulting from stimulation by a continuous, swept-frequency electrical source. It should be understood, however, that different electrical responses are possible. For example, stimulation by a series of discrete frequencies or stimulation by a short electromagnetic pulse that can simultaneously excite many frequencies.

The electrical response parameter may be for example, the impedance of the tag as measured by its reflected or absorbed power. Alternatively, the electrical response parameter can also be the voltages induced in a reader coil resulting from a pulse excitation of the tag. These approaches are illustrated schematically in FIGS. 14A and 14B.

The electrical response curve 150' includes one or more resonant features 155', 155" (generally 155). Referring to FIG. 3A, the resonant feature 155 may include a relative maximum, or peak value. Alternatively or in addition, the resonant feature 155 may include a relative minimum, or valley value. Generally, each resonant feature 155 is defined by feature aspects including a resonant frequency (e.g., $F_1$, $F_2$, etc.), a relative maximum (or minimum) amplitude (e.g., $E_1$, $E_2$, etc.), and a shape factor (e.g., $Q_1$, $Q_2$, etc.) relating to the "sharpness" of the resonance response. The shape factor may be defined, for example, by a quality factor "Q" relating to values of the equivalent electrical circuit parameters (R, L, C) at resonant frequency. One such quality factor is defined in equation 1:

$$Q \equiv \frac{f_r}{\Delta f_r} \quad \text{(Equation 1)}$$

where $f_r$ is a particular individual resonant frequency and $\Delta f_r$ is the width of the associated peak.

The multi-bit information encoded within the tag structure 100 is thus observable and retrievable through the electrical response represented in curve 150. Namely, respective portions of the multi-bit information may be encoded using the values of the resonant features 155 (i.e., the resonant frequency, the amplitude, and/or the Q value). FIG. 3A illustrates a resonant tag 100 whose response encodes two bits of information. In this figure, each bit of the multi-bit information is represented by a different resonant feature 155', 155" associated with a resonant frequency. The resonant frequency generally refers to that frequency at which the relative maximum (or minimum) value of the resonant feature 155 occurs. Thus, each bit of information may be distinguished according to its associated resonant frequency, each bit of information being associated with a respective frequency (i.e., $F_1$, $F_2$), or with a respective frequency range (i.e., $\Delta f_1$, $\Delta f_2$).

A value for each bit of information may thus be encoded in one or more of the respective amplitude, frequency, and/or the Q values of each resonant feature 155. In the exemplary embodiment encoding binary information illustrated in FIGS. 3A and 3B, an amplitude value occurring within a range about a first norm (e.g., within an amplitude range extending from a value of about $\Delta_2$ below the norm, to a value of about $\Delta_1$ above the norm) represents a binary "1." Accordingly, the electrical response curve 150' is representative of the multi-bit binary informational value of "$11_2$."

Amplitude ranges about a norm can be defined by absolute amplitude values, or as a percentage, e.g., 10%, of the norm value. The amplitude ranges may also be asymmetric about the norm (for example, $\Delta_1$ above the norm being 20% of the norm and $\Delta_2$ below the norm being 10% of the norm).

Similarly, an amplitude value occurring within a range about a second norm represents a binary "0." In some embodiments, as illustrated in FIG. 3B, the absence of a resonant amplitude in a range about a first norm represents a binary "0." That is, the amplitude of the electrical response curve is below the amplitude value of "NORM$-\Delta_2$," over the entire frequency range associated with a bit of the multi bit information. Accordingly, the electrical response curve 150" is representative of the multi-bit binary informational value of "$10_2$."

For embodiments having more than two norm values, multiple bits of information may be encoded at each resonant frequency. For example, at each resonant frequency, an embodiment may exhibit any of three allowed amplitude states ("0," "1," and "2,") thereby tripling the information encodable by frequency alone. Alternatively or additionally, a resonant peak 155 having an associated Q value occurring within a first range of Q values may represent a binary "0"; whereas, a resonant peak 155 having an associated Q value occurring within a second range of Q values would represent a binary "1." The analog data concerning the resonant frequencies may be converted to digital values using other techniques known to the art.

The multi-bit information stored in a particular tag may be modified in several ways through modification of the metal layer of the tag, the dielectric layer of the tag, or both. The metal and dielectric layers may be modified during the time of manufacture or during post-manufacture processing. In accord with the present invention, a typical embodiment of a tag includes at least one convenient location on the tag for implementing changes to the metal layer, the dielectric layer, or both.

Several types of modifications to the metal layer permit changes to the resonant frequencies of an individual tag design. Each resonance peak may be individually deactivated by severing its branch's connection to the rest of the structure or shorting opposing branches across the dielectric thickness. Increasing the length of a given branch adds additional turns without overlapping with the metal layer of the opposing face of the tag, increasing the inductance of that branch and altering its resonant frequency. Varying the amount of overlap between each branch and its corresponding branch on the opposing face of the tag by changing the trace length or the trace width affects the capacitance of the branch and, accordingly, its resonant frequency. The mutual inductance among the different branches of the tag may be varied by shifting the relative position of the individual metal traces, producing changes in the relative position of the individual resonance peaks. As in any multi-resonant structure, there is typically a coupling between the individual resonances that limits the extent to which each resonance may be tuned without affecting the values of the other resonant frequencies.

Likewise, the dielectric layer of the tag may be altered to modify the resonant frequencies of an individual tag design. The thickness of the dielectric, either globally or in localized areas, may be varied to change the resonant frequency of the tag. Holes in the dielectric layer create shorts between metal traces on opposite faces of the tag, eliminating resonance peaks. Inserting metal between the opposite faces of the tag, such as through the introduction of a dielectric having an embedded patterned metal layer, also reduces the capacitance of the tag, affecting its resonant frequencies.

In more detail, each of the current pathways 135, 140 illustrated in FIG. 1B typically corresponds to at least one bit of the multi-bit information encoded within the tag structure 100. The resonant features 155 associated with each bit of the multi-bit information stored by the tag structure 100 are related to the physical properties of the current pathways 135, 140. The physical properties include the physical dimensions of the current pathways 135, 140—such as an overall length of the tag structural elements defining the current pathway 135, 140, their related widths, or their related thicknesses. The length of a particular current pathway 135, 140 relates generally to the resonant frequency $F_1$, $F_2$. Thus, the resonant frequency may be controlled by the length of the current pathway 135, 140.

As previously described in relation to FIG. 2, the tag structural elements defining a respective current pathway 135, 140 have an associated distributed inductance value related to the electrical conductor, represented by lumped inductors $L_1'$ and $L_2'$. Similarly the tag structural elements defining respective current pathways have an associated distributed capacitance value, generally related to the overlap of the respective structural elements. This capacitance value may be represented by equivalent lumped capacitors $C_1$ and $C_2$. This represents yet another way to modify the resonant spectrum of the tag, hence the ability of a single tag to encode multi-bit information.

Additionally, resonant features 155 associated with each bit of the multi-bit information stored by the tag structure 100 may be modified by varying the separation distance between the opposing folded halves 105', 105". The amount of physical separation distance controls the capacitance between the halves 105', 105", thereby affecting the resonant frequency value. Similarly, the physical properties (e.g., dielectric constant or electrical permittivity, $\in$) of a material disposed between the respective halves 105', 105" may be used to tune the resonant frequency, again by altering an associated capacitance.

Inter-branch capacitance between different branches of the tag is created by the overlap area between branches on opposing folded halves 105', 105" of the tag. The inter-branch capacitance may be used to control the relative amplitude value of resonant features 150, thereby adjusting the respective amplitudes to approach within a boundary about the norm. A tag structure 100 that encodes informational values using norms is advantageous as it simplifies the detection of the encoded information. For example, an interrogated tag that produces an amplitude response substantially bounded about a norm simplifies the dynamic range requirements of a tag receiver by limiting the dynamic range to a known value. Limiting expected amplitude variations about a norm also simplifies detection circuitry in a tag reader because the detector's decision circuitry (i.e., circuitry distinguishing between a binary 0 or 1) may be designed to operate using well-defined, bounded amplitude ranges.

A tag producing an amplitude response whereby informational values are substantially bounded by respective norms may more readily accommodate tags using amplitude to store more than one bit of information in a given frequency range. A suitably designed tag, when interrogated, produces an amplitude response having amplitude values substantially contained within respective norms. For example, a ternary system can have at least two different amplitude norms. As the tag's amplitude response is constrained about the norms, the different norm values can be selected relatively close to each other (e.g., both amplitude values being within the same order of magnitude).

Variations in the material of the current pathways 135, 140 may be used to, among other things, vary the respective Q value. For example, providing a current pathway 135 made of a first material having a given resistivity and/or electrical conductivity results in a first structural electrical loss value (e.g., resistors $R_1'$ and $R_2'$ of FIG. 2). As the Q value varies with the value of structural loss, increasing the value of $R_1'$ and $R_2'$ tends to reduce the associated Q value. Similarly, reducing the structural loss by reducing the values of $R_1'$ and $R_2'$ tends to increase the associated Q value.

Figure 4:
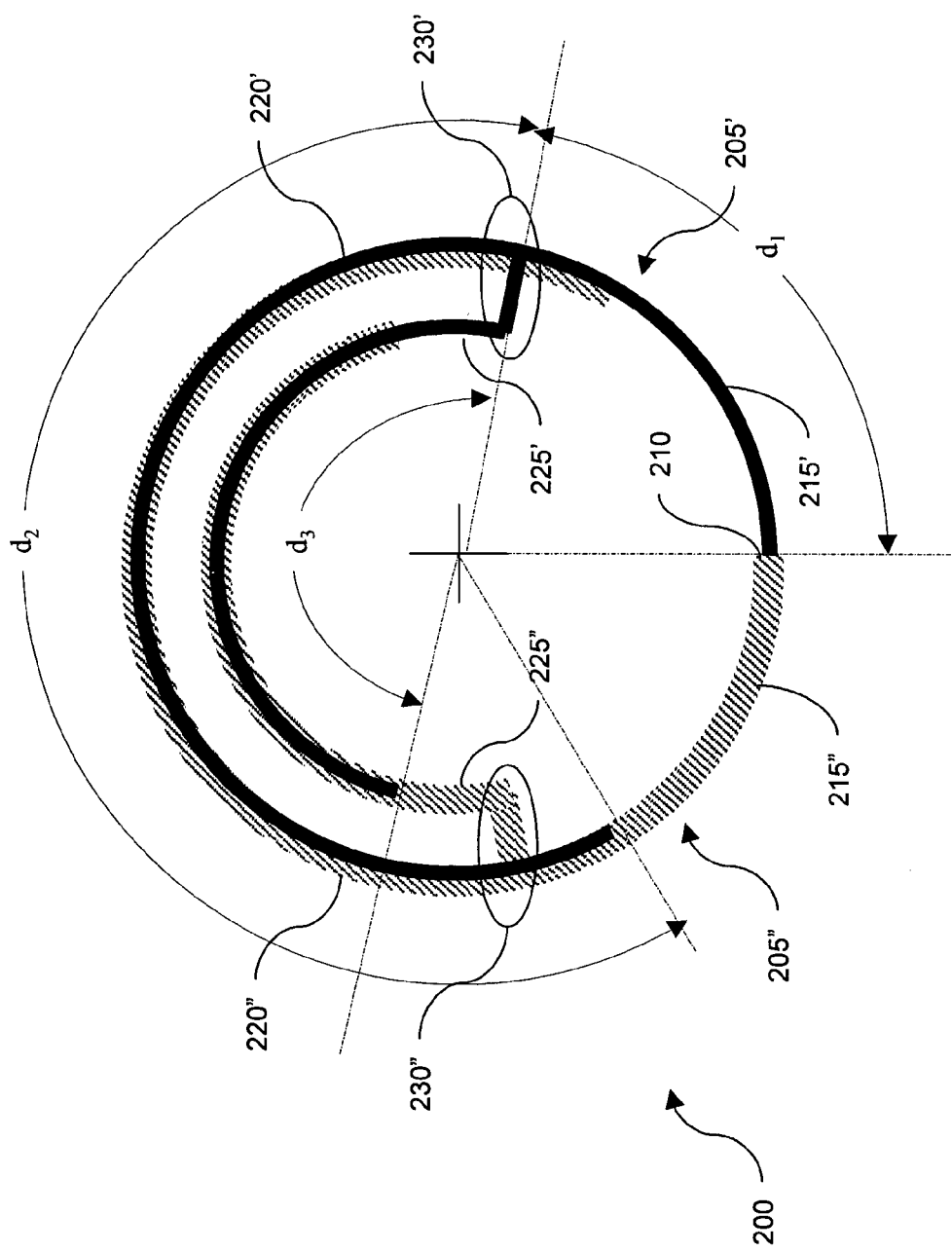
FIG. 4 is a schematic diagram depicting an embodiment of the present invention having a circular geometry.

FIG. 4 illustrates an open loop tag structure 200 having a top half 205', shown in black, and a bottom half 205", shown in crosshatch, with current paths corresponding to those of FIG. 1B. The top half 205' and bottom half 205" are interconnected by a shunt 210 at the point where the two halves of the tag are folded. The top half 205' includes a first segment 215' in electrical communication at one end with the shunt 210. The top half 205' also includes a first top branch 220' in electrical communication at one end to another end of the first segment 215', and a second top branch 225', also electrically connected at one end to the top branch 220'. The first segment 215', the first top branch 220', and the second top branch 225' are interconnected, thereby forming a node 230'.

Similarly, the bottom half 205" includes a first segment 215" in electrical communication at one end with the shunt 210. The bottom half 205" includes a first bottom branch 220" in electrical communication at one end to another end of the first segment 215", and a second bottom branch 225" electrically connected at one end to the same end of the bottom branch 220", thereby forming a node 230" at the intersection of the first segment 215", the first branch 220", and the second branch 220".

As illustrated, the top and bottom halves 205', 205" are configured as arcs defining at least a portion of a circle or, more generally, an ellipse. In one embodiment, the top and bottom halves 205', 205" are disposed in opposite orientations as viewed from one side, such that the electrical current in either half flows in the same general direction (e.g., clockwise, or counterclockwise). The respective lengths of the segments 205', 205" ($d_1$), the first branch 210', 210" ($d_2$), and the second branch 215', 215" ($d_3$) are selectable. The relative lengths $d_1$, $d_2$, $d_3$, as well as the diameter of the open loop, control the extent of any overlap between respective elements of the tag structure 200. Similarly, the relative lengths of $d_2$, $d_3$, as well as the diameter of the open loop, control the extent to which the first branch 210' and second branch 215' are disposed adjacently to each other, thereby affecting a related inter-branch capacitance value.

Figure 5:
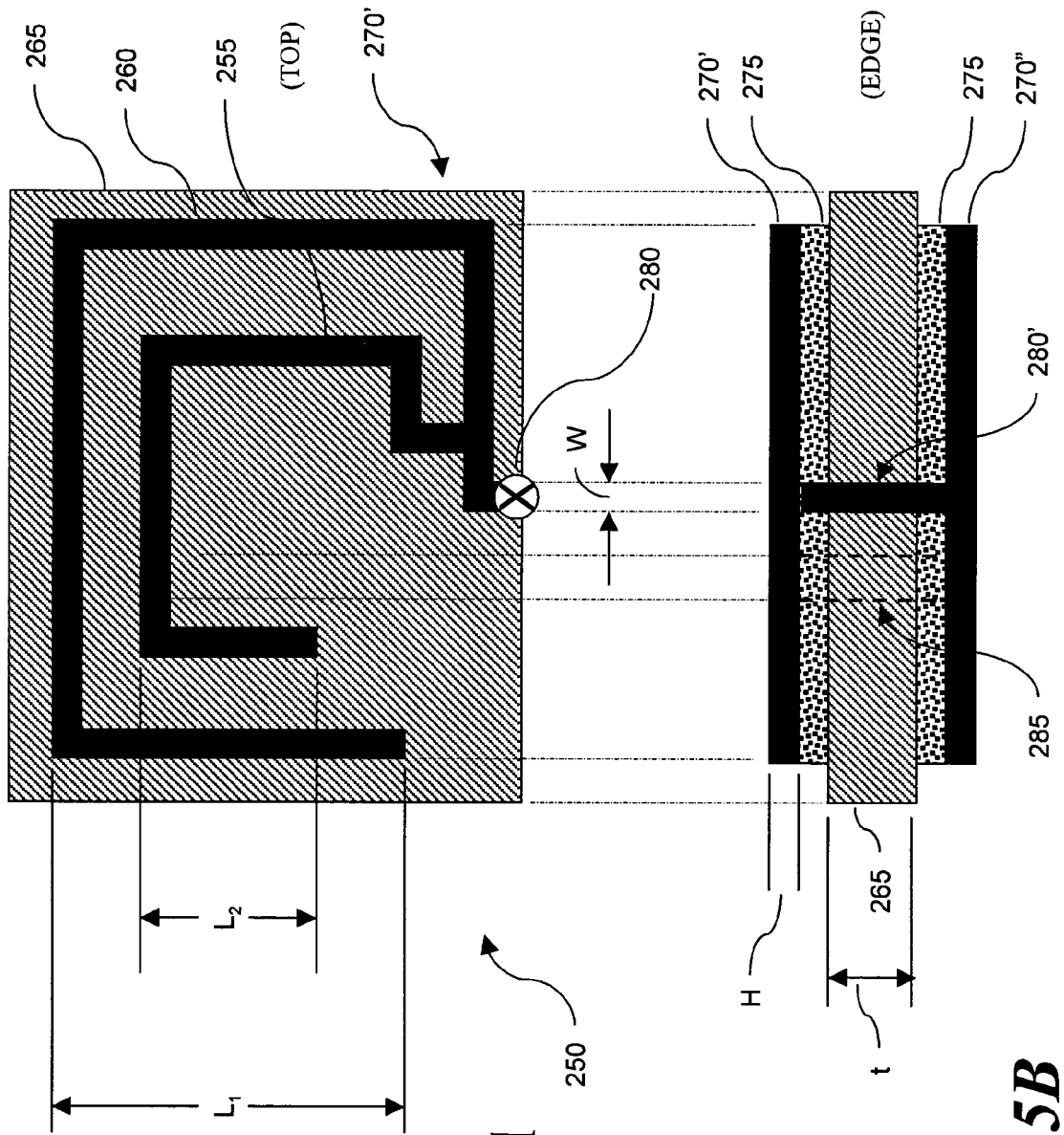
FIGS. 5A and 5B are plan and elevational views of an alternative embodiment of the open-loop geometry illustrated in FIG. 4.

An angular, open loop tag structure 250 is shown in FIGS. 5A and 5B. The structure 250 has two current pathways 255, 260 corresponding to those illustrated in FIG. 4. The current pathways 255, 260 may be fashioned from an electrical conductor (e.g., copper, aluminum, nickel, silver, gold) or from combinations of electrical conductors (e.g., nickel-plated copper), e.g., from one or more piecewise linear segments, each having a substantially rectangular cross section, with a width W and a height h.

As illustrated, the current pathways 255, 260 may be disposed upon a dielectric material 265. The dielectric material 265 may be fashioned from any suitable dielectric material, with associated dielectric constant, $\in$. Some exemplary dielectric materials include Mylar sheet, Duroid, fiberglass, ceramic, silicon, polypropylene, polyethylene (PET), and more generally, polymeric materials. The dielectric material may be fashioned in a planar configuration having a thickness, t. Alternatively, the dielectric material 265 may be fashioned in a tape, such that the current pathways 255, 260 are disposed upon one side of the tape. In this manner, the resulting tag structure 250 may be formed by folding the dielectric tape in a controlled manner, such that a top half 270' and a bottom half 270" substantially overlap each other.

The current pathways 255, 260 may be fixedly applied to the dielectric material 265 in any suitable manner, such as the varied techniques available for forming conductive etches upon a printed circuit board (e.g., chemical etching, photo-resist etching, silk screening, printing, etc.). In one embodiment, the current pathways 255, 260 are formed independently from the dielectric material 265. For example, the material of the current pathways 255, 260 may include an adhesive 275 on one side, such as a pressure sensitive adhesive. The adhesive 275 allows the current pathways 255, 260 to be bonded to the dielectric material 265 in the manner of tape. The top and bottom halves 270', 270" may be interconnected by a shunt 280, which may be a conductive material (e.g., a pin, screw, rivet, a solder joint, a plated through hole, or another segment of adhesive strip in which the adhesive is itself conductive).

To control the resonance response of the resulting tag structure 250, the overall lengths, as well as the relative lengths, of the current pathways 255, 260 may be preselected. The lengths of each of the current pathways 255, 260 may be predetermined and selected during a fabrication process for the tag 150 (i.e., the lengths are established when the conductive pathways are first applied to the conductive material 265). Alternatively, the lengths may be determined after fabrication, e.g., by selective removal of material by the user.

Figure 6:
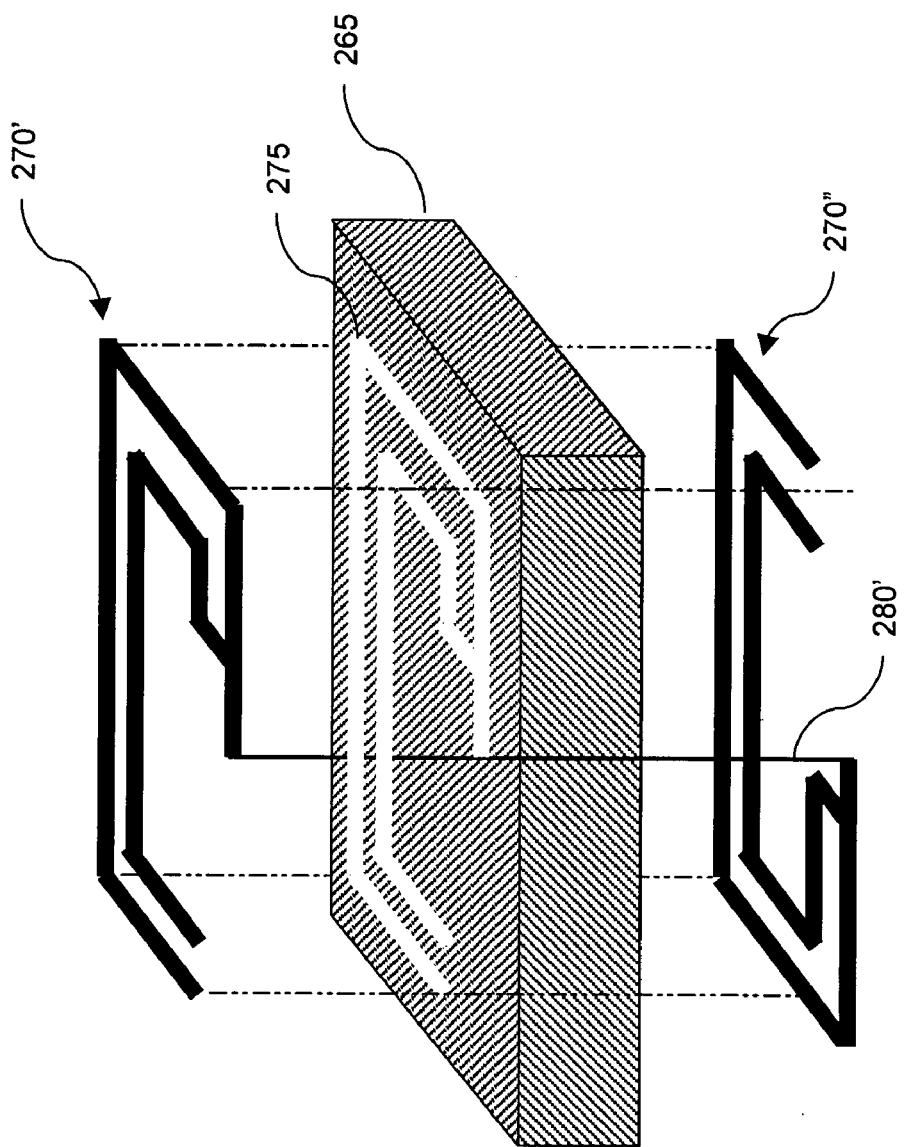
FIG. 6 is an exploded perspective diagram depicting the embodiment of FIGS. 5A and 5B.

Some methods of varying the lengths include prefabricating the tag 250 with the current pathways having a maximum length. Thus, the length may be selectably shortened after fabrication by removing one or more portions of the current pathways 255, 260 from at least one end of the current pathways 255, 260. For example, the ends of the current pathways 255, 260 may be cut away. Additionally, the ends of one or more of the current pathways 255, 260 may be selectively short circuited, e.g., from the top half 270' to the bottom half 270" using a shorting device 285, such as a conductive pin, screw, rivet, or even a dimple that places the top and bottom halves 270', 270" into physical contact with each other. FIG. 6 illustrates in exploded view the tag 250 of FIGS. 5A and 5B.

Figure 7:
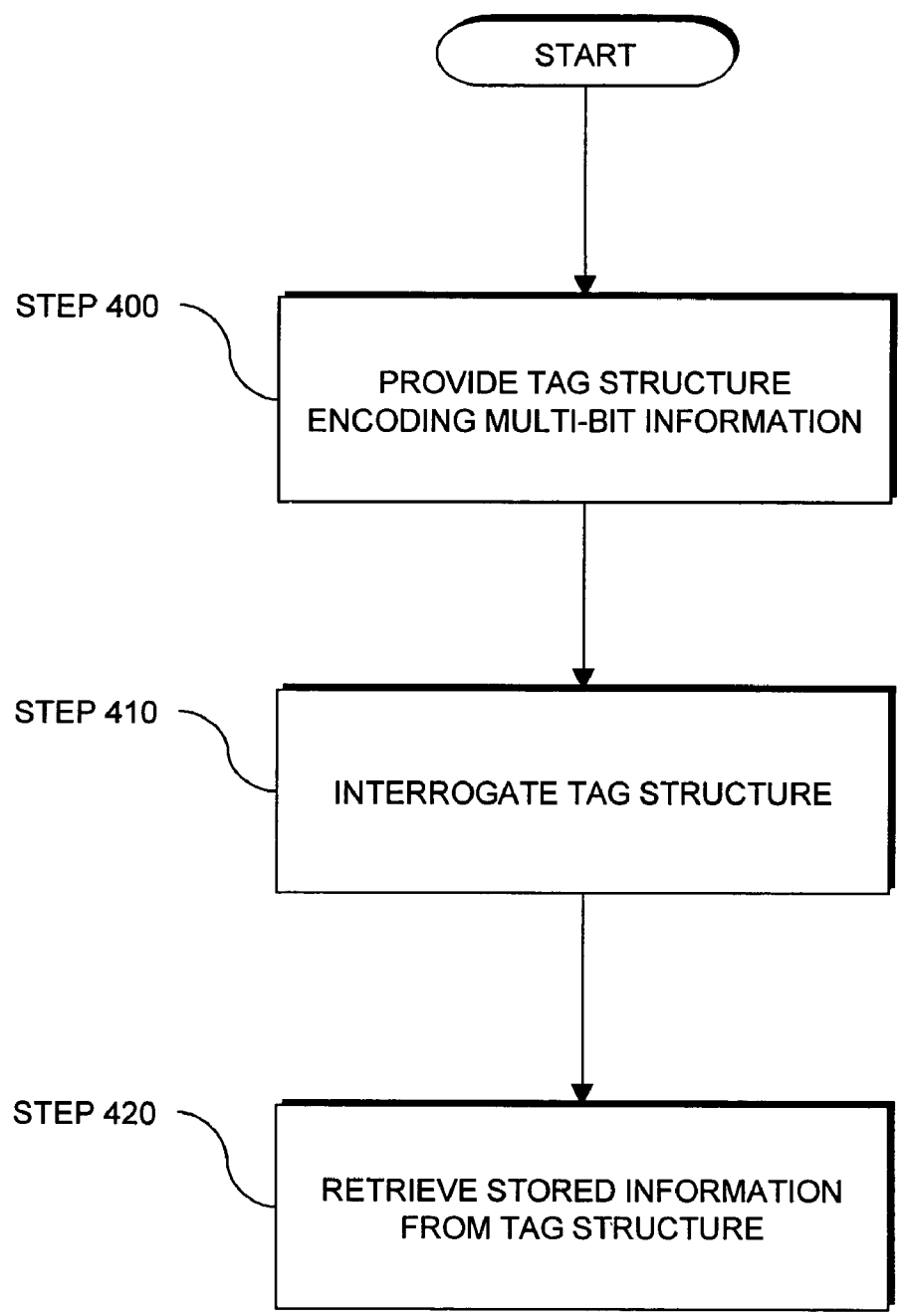
FIG. 7 is a flow chart of an embodiment of a method in accordance with the present invention.

Referring now to FIG. 7, in operation a tag structure encoding multi-bit information is provided (step 400). The tag structure is then interrogated (step 410). In one embodiment, the interrogation includes subjection to an interrogating electromagnetic signal. Finally, the encoded multi-bit information is retrieved from the tag structure (step 420).

Figure 8:
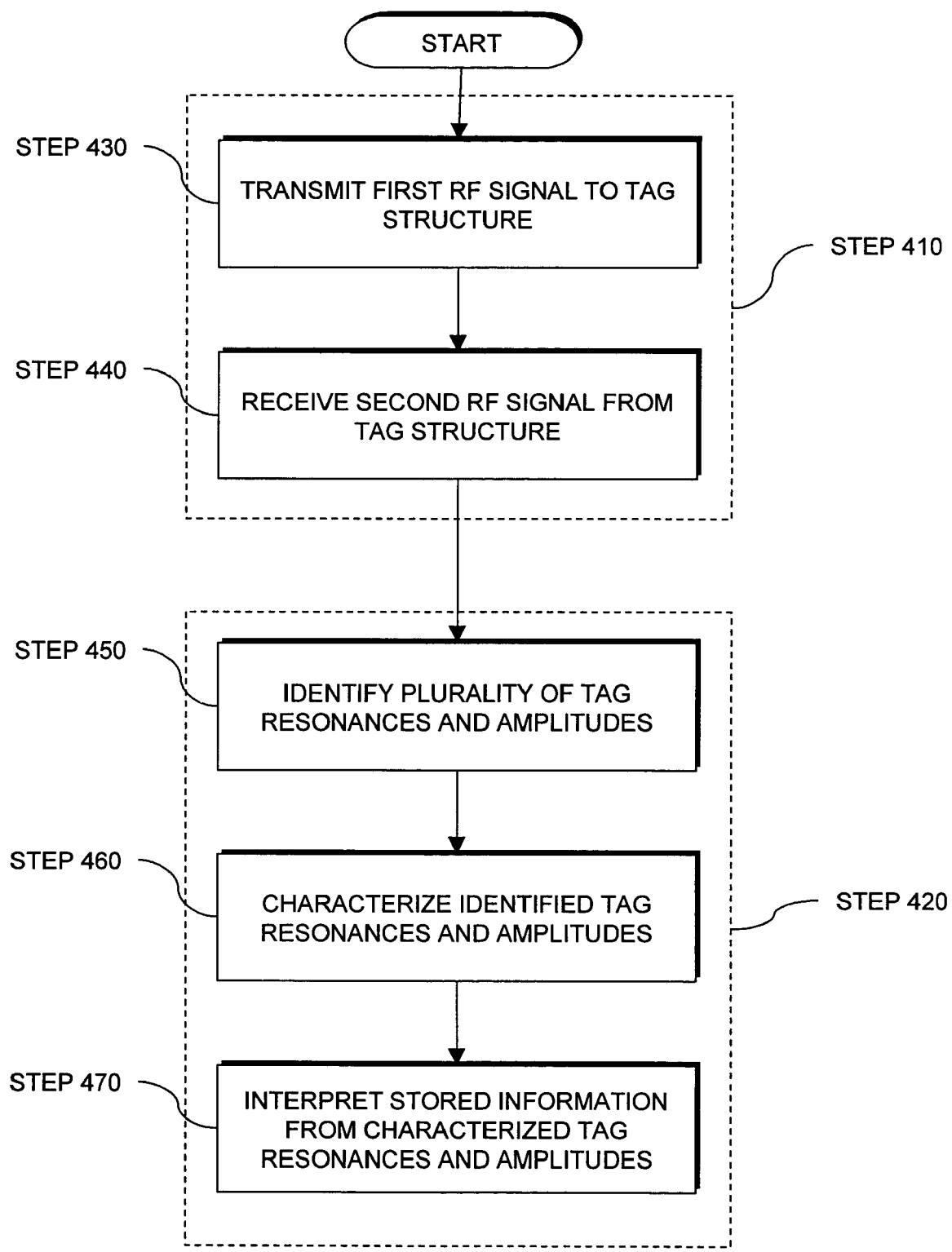
FIG. 8 is a flow chart of a second embodiment of a method in accordance with the present invention.
Figure 9A:
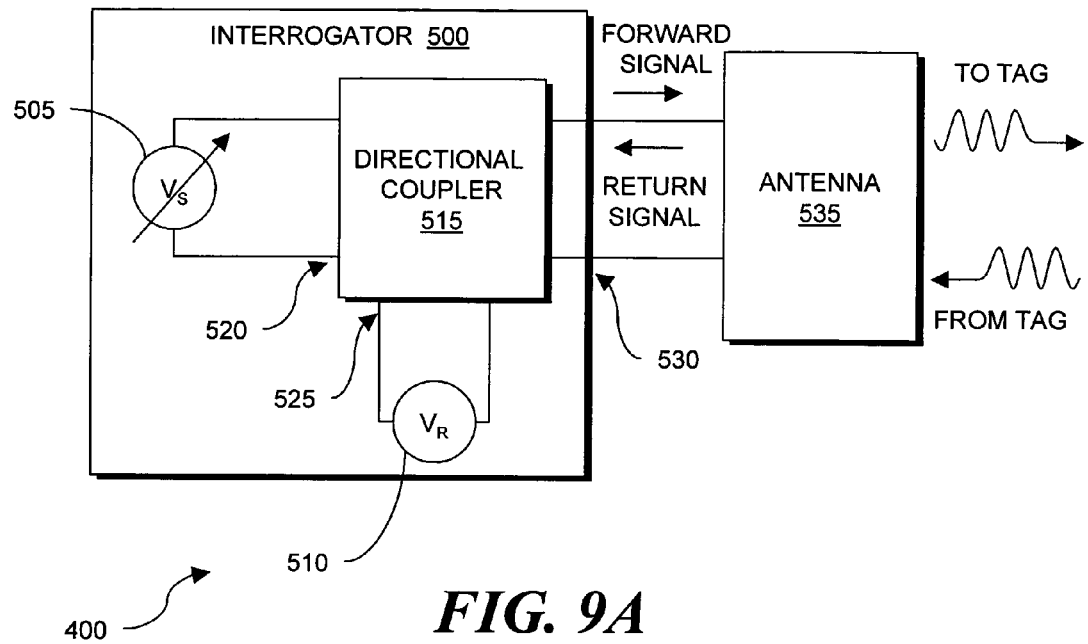
FIGS. 9A and 9B are schematic diagrams illustrating two approaches for interrogating a tag in accord with the present invention.

In more detail, referring now to FIG. 8, interrogation of the tag structure may include transmitting a radio frequency (RF) signal in proximity to the tag structure (step 430). The interaction of the interrogation signal with the tag structure results in electrical currents being induced within the conductive elements of the tag structure. These currents, in turn, generate electromagnetic fields that represent an electromagnetic (RF) response signal. A suitably configured receiver receives the response signal from the tag structure (step 440). The received response signal is processed to identify the one or more resonance features encoding the multi-bit information (step 450). Each of the identified resonance responses is further processed to characterize the resonant features (e.g., resonant frequency, amplitude, Q value, etc.) (step 460). Finally, the characterized features are interpreted (step 470) to recover the encoded multi-bit information FIG. 9A illustrates one embodiment of an interrogator 500. The interrogator 500 includes a source (such as a swept-frequency voltage source 505), a signal detector (such as a square-law power detector 510) and a directional coupler 515. The directional coupler 515 may include three ports 520, 525, 530. The directional coupler 515 generally transfers signals received at the first port 520 to the third port 530, and transfers signals received at the third port 530 to the second port 525. The voltage source 515 is in electrical communication with the first port 520, transmitting an interrogation signal thereto. The third port 530 is in electrical communication with an antenna 535, which transmits the interrogation signal received from the voltage source 505 to one or more tags of opportunity located within the range of the antenna 535.

The antenna 535 then receives a response signal generated by a tag responsive to the interrogation signal. The antenna 535 forwards the received response signal to the third port 530. The directional coupler 515 transfers the received response signal to the detector 510 via the second port 525. The detector 510 receives the response signal and performs a detection function. The detected signal may be forwarded to a computer or other processor for additional processing.

Figure 9B:
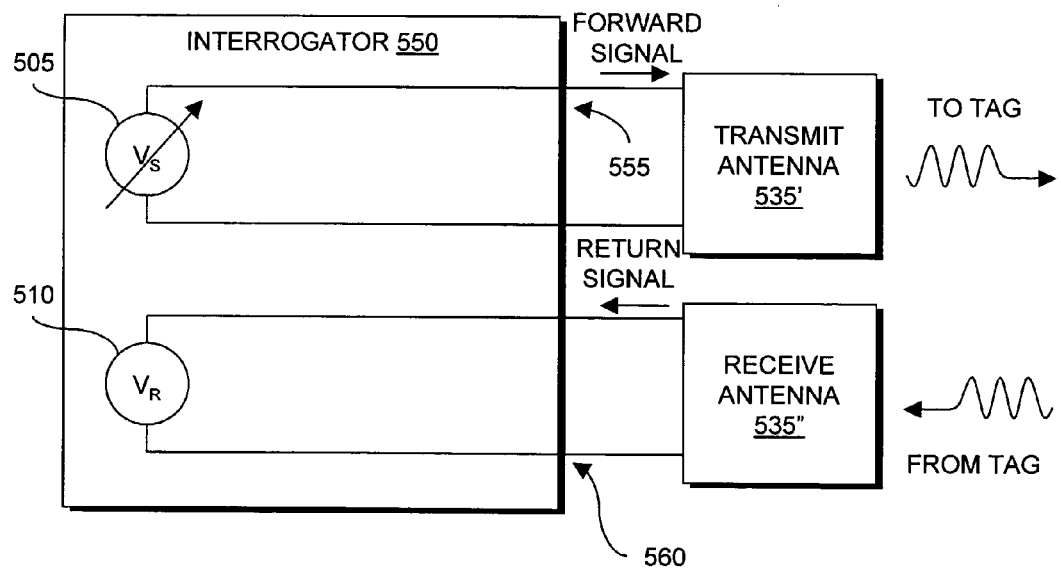

FIG. 9B illustrates an alternative embodiment of an interrogator 550 configured without a directional coupler. The interrogator 550 includes the swept-frequency voltage source 505 and the detector 510. The interrogator is in electrical communication with a transmit antenna 535' through a first port 555. The interrogator is also in electrical communication with a receive antenna 535" through a second port 560. The source 505 transmits the interrogation signal to a tag of opportunity via the transmit antenna 535'. The detector 510 receives a response signal from an interrogated tag via the receive antenna 535".

Figure 10A:
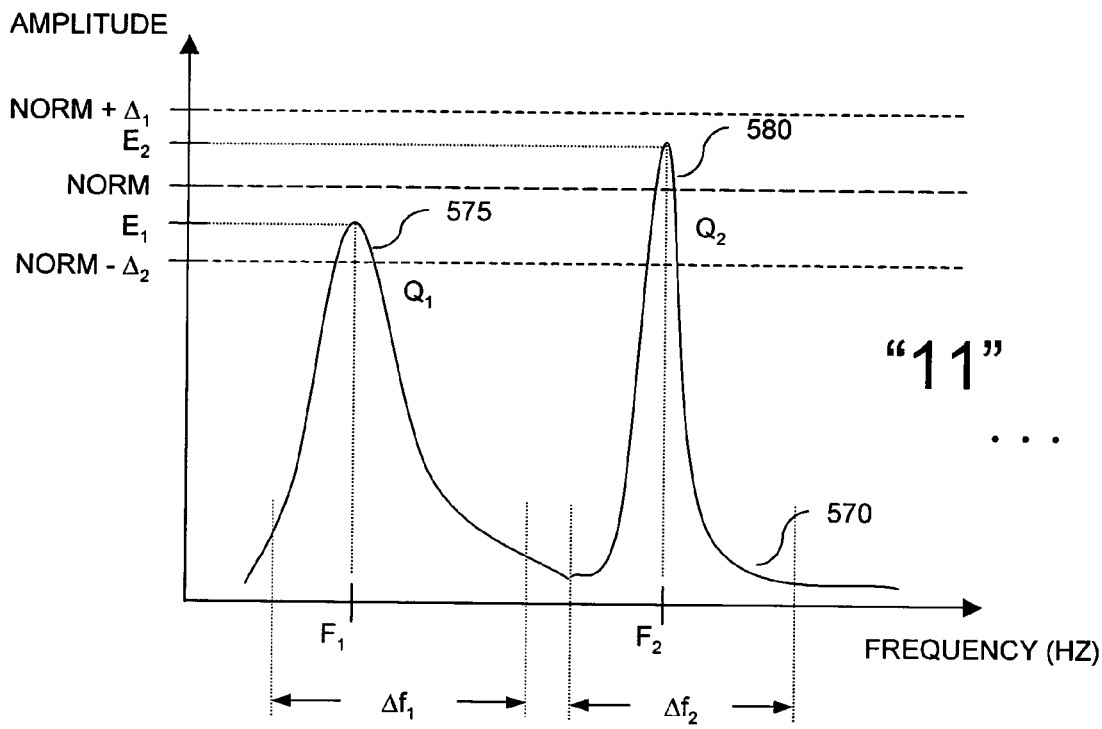
FIG. 10A illustrates the electromagnetic response of an embodiment of the invention.
Figure 10B:
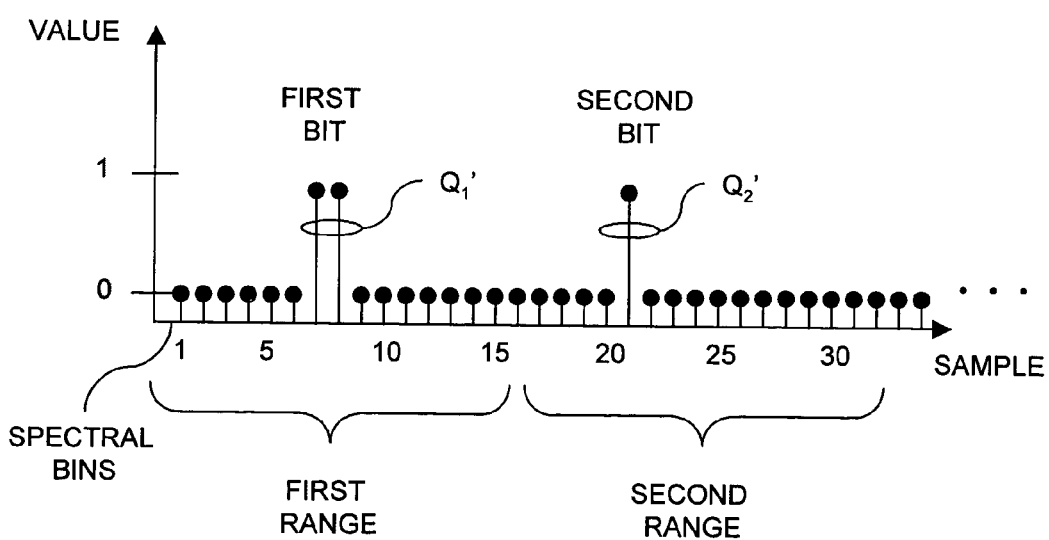
FIG. 10B presents a converted version of the graphical response illustrated in FIG. 10A.

In one embodiment, referring now to FIGS. 10A & 10B, a frequency response signal 570 is received at a detector. In one embodiment, the detector receives a time-domain response signal from the interrogated tag and converts the received signal into the frequency domain. For example, the detector may perform a fast Fourier transform of a detected time-domain signal. In other embodiments, the detector may include a "chirp" transform device (e.g., using a surface acoustic wave transducer) to produce a representative frequency response curve from a received time-domain response curve. In this example, the frequency response signal 570 includes two resonant features 575, 580. The resonant features 575, 580 respectively include relative maximum values at $F_1$ and $F_2$. Each of the resonant features 575, 580 also respectively includes an associated maximum amplitude, $E_1$ and $E_2$, each approaching a norm and having an associated Q value, $Q_1$, and $Q_2$.

In one embodiment, the detector samples the received signal at a number of frequencies, providing a binary "1" output if the sampled response value is above a detection threshold, such as the norm value minus a predetermined threshold, $\Delta_2$. Similarly, the detector provides a binary "0" output if the sampled response curve is below the detection threshold for that sample. A single "1" value may indicate a first resonance, the resonant frequency being approximately related to the sample number. Similarly, a cluster of adjacent 1's may also indicate a single resonant peak 575 having an associated Q value lower than the Q value of the resonant peak 580. As discussed above, digital data may be extracted from the analog resonant frequency information in accord with the present invention using a variety of techniques known to the art.

Having shown the preferred embodiments, one skilled in the art will realize that many variations are possible within the scope and spirit of the claimed invention. It is therefore the intention to limit the invention only by the scope of the claims.

What is claimed is:

1. A device responsive to a wireless electromagnetic interrogation signal, comprising a plurality of electromagnetically coupled branching structural elements that support a plurality of non-equivalent interacting passively resonant current pathways that together represent multi-bit information, each of the pathways responding differently to the interrogation signal and the responses simultaneously contributing to the provision of the multi-bit information, wherein at least one of the pathways is altered to encode the represented multi-bit information.

2. The device of claim 1, wherein each of the pathways exhibits a different electromagnetic response to the signal having at least one electromagnetic resonance, the responses differing from each other in at least one of resonant frequency, amplitude, quality ("Q") factor, or damping.

3. The device of claim 2, wherein each resonance corresponds to a different inductance parameter of the device.

4. The device of claim 1, wherein the alteration includes severing at least one pathway from the other pathways.

5. The device of claim 1, wherein the alteration includes shorting at least one pathway to a pathway on an opposing face of the device.

6. The device of claim 1, wherein the alteration includes changing the length of at least one pathway.

7. The device of claim 1, wherein the alteration includes changing the overlap between at least one pathway and its corresponding pathway on the opposing face of the device.

8. The device of claim 1, wherein the alteration includes changing the position of at least one pathway relative to the other pathways.

9. The device of claim 1 wherein the alteration includes changing the spacing between at least one pathway and its corresponding pathway on the opposing face of the device.

10. The device of claim 1, wherein the alteration includes changing the capacitance of at least one pathway by placing a metal element between the at least one pathway and its corresponding pathway on the opposing face of the device.

11. An electromagnetically-responsive structure for encoding multi-bit information, the encoded information being wirelessly readable in a frequency domain, the structure comprising:
- a first passively resonant current pathway having a first electromagnetic response; and
- at least one additional nonequivalent passively resonant current pathway having at least one additional electromagnetic response simultaneous with the first electromagnetic response, the at least one additional nonequivalent current pathway being electromagnetically coupled to the first current pathway, wherein the electromagnetic coupling results in at least one attribute of the combined simultaneously resonating first and additional electromagnetic responses approximating a norm, and wherein at least one of the pathways is altered to encode the represented multi-bit information.

12. The structure of claim 11, wherein at least a portion of the multi-bit information is readable through variations in at least one of the salient features of the electromagnetic responses, the at least one salient feature selected from the group consisting of resonant frequency, amplitude, quality ("Q") factor, and damping.

13. The structure of claim 11, wherein at least one of the current pathways comprises an open-loop geometry.

14. The structure of claim 13, wherein the open-loop geometry comprises a pair of matched open-loop patterns.

15. The structure of claim 14, wherein the matched open-loop patterns comprise conductive patterns.

16. The structure of claim 11, wherein at least one of the current pathways comprises a closed-loop geometry.

17. The structure of claim 11, wherein predetermined geometries of each of the first and second current pathways produce a first and second electrical resonance respectively.

18. A method for encoding multi-bit information on a wireless tag, the encoded information being wirelessly readable in a frequency domain, the method comprising:
- (a) providing a first passively resonant current pathway having a first electromagnetic response;
- (b) providing at least one additional nonequivalent passively resonant current pathway having at least an additional electromagnetic response simultaneous with the first electromagnetic response, the at least one additional nonequivalent current pathway being electromagnetically coupled to the first current pathway, wherein the electromagnetic coupling results in at least one attribute of the combined simultaneously resonating first and additional electromagnetic responses approximating a norm; and
- (c) altering at least one of the current pathways to encode the represented multi-bit information.

19. The method of claim 18, wherein the salient features of the combined electromagnetic responses of the first and second current pathways encode the multi-bit information.

20. The method of claim 18, wherein the first and second current pathways are physically adjoined.

21. The method of claim 18, wherein the alteration includes varying one or more of pathway length, pathway overlap area, or pathway relative position.

22. The method of claim 18, wherein the alteration includes electrically shorting a pathway.

23. A method of wirelessly sensing multi-bit information comprising the steps of:
- (a) providing a device responsive to a wireless electromagnetic excitation signal and having a plurality of electromagnetically coupled branching structural elements that support a plurality of non-equivalent interacting passively resonant current pathways that together represent the multi-bit information, wherein at least some of the plurality of pathways have been altered to encode the multi-bit information, each of the pathways responding differently and simultaneously to the excitation signal and;
- (b) subjecting the device to the wireless electromagnetic excitation signal;
- (c) extracting salient features of an overall simultaneous electromagnetic response of the device; and
- (d) recovering the multi-bit information based on the values of the salient features in the electromagnetic response.

24. The method of claim 23, wherein the plurality of pathways present varying electromagnetic responses exemplified by at least one salient parameter selected from the group consisting of resonant frequency, amplitude, relative peak position, relative peak amplitude, quality ("Q") factor, or damping.

25. The method of claim 23, wherein each of the salient features corresponds to a different capacitance feature of the device.

26. The method of claim 23, wherein each of the salient features corresponds to a different inductance feature of the device.

27. The method of claim 23, wherein the step of recovering the multi-bit information comprises sensing a plurality of electromagnetic resonances of the device induced by the signal.

28. The method of claim 23, wherein the alteration includes severing at least one pathway from the other pathways.

29. The method of claim 23, wherein the alteration includes shorting at least one pathway to a pathway on an opposing face of the device.

30. The method of claim 23, wherein the alteration includes changing the length of at least one pathway.

31. The method of claim 23, wherein the alteration includes changing the overlap between at least one pathway and its corresponding pathway on the opposing face of the device.

32. The method of claim 23, wherein the alteration includes changing the position of at least one pathway relative to the other pathways.

33. The method of claim 23, wherein the alteration includes changing the spacing between at least one pathway and its corresponding pathway on the opposing face of the device.

34. The method of claim 23, wherein the alteration includes changing the capacitance of at least one pathway by placing a metal element between the at least one pathway and its corresponding pathway on the opposing face of the device.

35. The method of claim 23, wherein the step of recovering the multi-bit information comprises:
- (c-1) sensing an analog frequency spectrum of the device induced by the signal; and
- (c-2) translating the analog spectrum to a digital code.

36. An electromagnetically-responsive structure for encoding multi-bit information, the encoded information being wirelessly readable in a frequency domain, the structure comprising:
- a first pathway characterized by having a first electromagnetic response and having a pair of opposing, electrically-conductive traces electrically connected through at least one point; and a second nonequivalent electrically-conductive pathway electromagnetically coupled to the first pathway and having a second electromagnetic response simultaneously with the first electromagnetic response, the second pathway having a pair of opposing, electrically-conductive traces electrically connected through at least one point and in electrical communication with the first pathway traces at at least one point, wherein the electromagnetic coupling between the first and second electromagnetic responses results in at least one attribute of the simultaneously resonating first and second electromagnetic responses approximating a norm.

* * * * *